United States Patent
Merrell et al.

(10) Patent No.: US 7,351,065 B1
(45) Date of Patent: Apr. 1, 2008

(54) METHOD AND ELECTRONIC DEVICE CONNECTOR WITH BAND AND ANGLE ENCODING

(75) Inventors: Thomas Y. Merrell, Beach Park, IL (US); Rachid M. Alameh, Crystal Lake, IL (US); Thomas E. Gitzinger, Libertyville, IL (US); Michael J. Slade, Libertyville, IL (US); David R. Zeiger, Mundelein, IL (US)

(73) Assignee: Motorla, Inc., Schaumburg, IL (US)

( * ) Notice: Subject to any disclaimer, the term of this patent is extended or adjusted under 35 U.S.C. 154(b) by 0 days.

(21) Appl. No.: 11/690,484

(22) Filed: Mar. 23, 2007

(51) Int. Cl.
*H01R 39/00* (2006.01)
(52) U.S. Cl. ........................ 439/31; 439/165
(58) Field of Classification Search .................. 439/31, 439/11, 13, 165
See application file for complete search history.

(56) References Cited

U.S. PATENT DOCUMENTS

| | | | |
|---|---|---|---|
| 3,860,312 A * | 1/1975 | Gordon, Jr. .................. | 439/31 |
| 5,799,079 A | 8/1998 | Inoue | |
| 6,991,497 B1 | 1/2006 | Lin | |
| 7,046,799 B2 | 5/2006 | Ma | |
| 7,214,067 B2 * | 5/2007 | Zaderej ........................ | 439/31 |
| 2002/0021800 A1 * | 2/2002 | Bodley et al. .............. | 379/430 |
| 2005/0112909 A1 * | 5/2005 | Zaderej et al. ................ | 439/31 |
| 2005/0261040 A1 | 11/2005 | Andersson et al. | |
| 2006/0048340 A1 | 3/2006 | Zaderej | |
| 2006/0112670 A1 | 6/2006 | Blase et al. | |

* cited by examiner

*Primary Examiner*—Tho D. Ta
(74) *Attorney, Agent, or Firm*—Hisashi D. Watanabe

(57) ABSTRACT

Disclosed is a connector including two mating sleeves, at least one of which having a plurality of first conductive contacts, a second mating sleeve configured to be rotatably joined to the first mating sleeve and also configured to support circuitry. The connector may also include at least one shaft configured to join the two mating sleeves to form a hinge. The shaft may further include at least a plurality of second conductive contacts, at least some of which that form portions of rings to make intermittent contact with at least one of the first conductive contacts based on the position of the at least one shaft relative to the position of at least one of the two mating sleeves. Embodiments of the connector may include a jack style hinge configuration, a hinge and pin style configuration, a hinge without a pin style configuration, or a spring loaded bolt configuration.

20 Claims, 9 Drawing Sheets

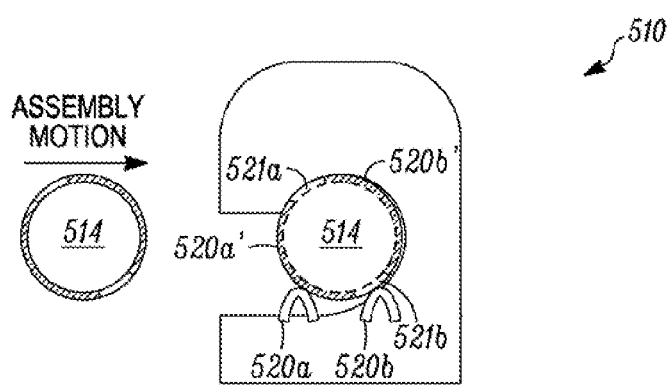
FIG. 5
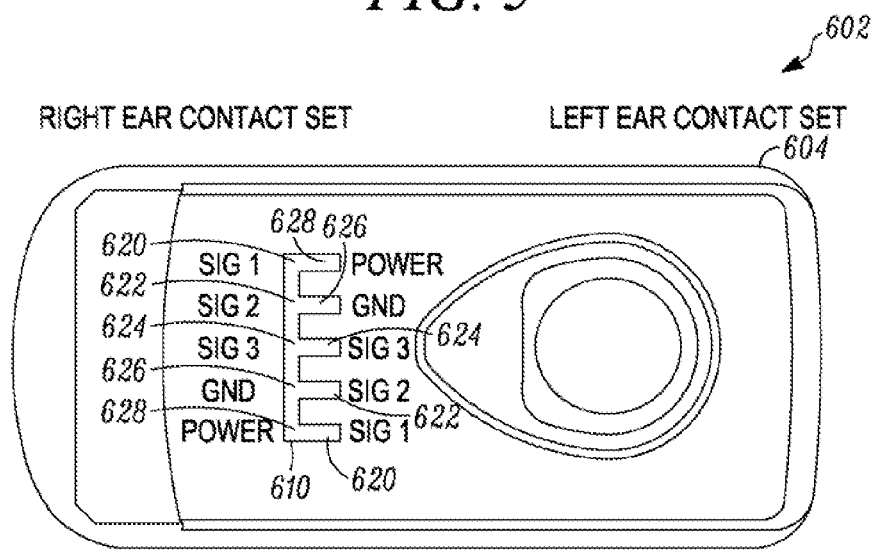
FIG. 6
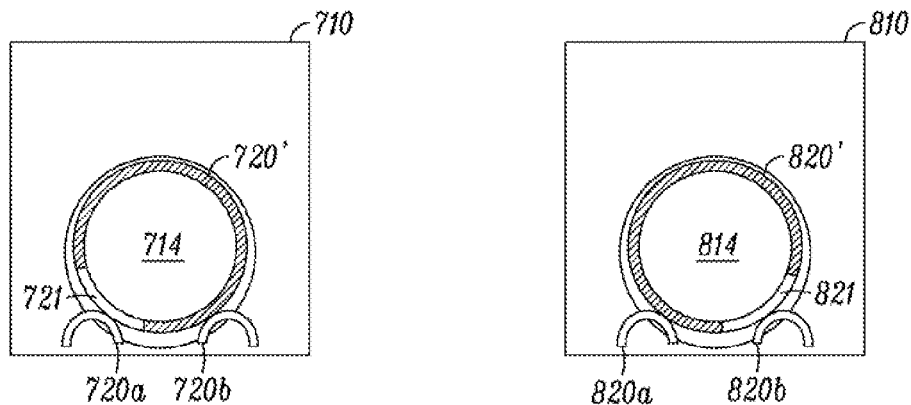
FIG. 7
FIG. 8

US 7,351,065 B1

METHOD AND ELECTRONIC DEVICE CONNECTOR WITH BAND AND ANGLE ENCODING

FIELD

Disclosed is a connector for an electronic device, and more particularly a connector with band and angle encoding for conductive contacts, the connector including two mating sleeves, at least one sleeve with conductive contacts, the second sleeve configured to be rotatably joined to the first mating sleeve and to support circuitry.

BACKGROUND

The makers of mobile communication devices, including those of cellular telephones, are increasingly adding functionality to their devices. While there is a trend toward the inclusion of more features and improvements for current features, there is also a trend toward smaller mobile communication devices. As mobile communication device technology has continued to improve, the devices have become increasingly smaller. Therefore, there may be less surface area for placement of user interface components and connectors as manufacturers continue to add features and reduce their products' size.

Cellular telephones typically have a handset form factor configured so that a user holds the device to the ear while it is engaged in operation. A hands-free device, such as a headset that is either in wireless or wired communication with a cellular phone, and/or a wearable cellular telephone, can free a user from the need to hold a handset form factor cellular phone to his or her ear. A headset or a wearable cellular telephone device, however, may be limited in functionally due to limited surface area and interior volume. A wearable hands-free device may be additionally limited by a weight constraint since such a device is typically head worn.

BRIEF DESCRIPTION OF THE DRAWINGS

FIG. 5 depicts a connector shaft including two conductive portions of a ring having insulating material between the conductive portions illustrating in more detail one of the plurality of rings shown in FIG. 3;

FIG. 6 depicts an embodiment of a wearable electronic device in which an earmount is detached from the housing to illustrate that the contacts may be in a reverse order depending upon the orientation of the earmount;

FIG. 7 depicts a schematic view of a connector shaft in position against a contact corresponding to a right ear configuration for an earmount;

FIG. 8 depicts a schematic view of the connector shaft in position against a contact corresponding to a left ear configuration for an earmount;

DETAILED DESCRIPTION

Figure 1:
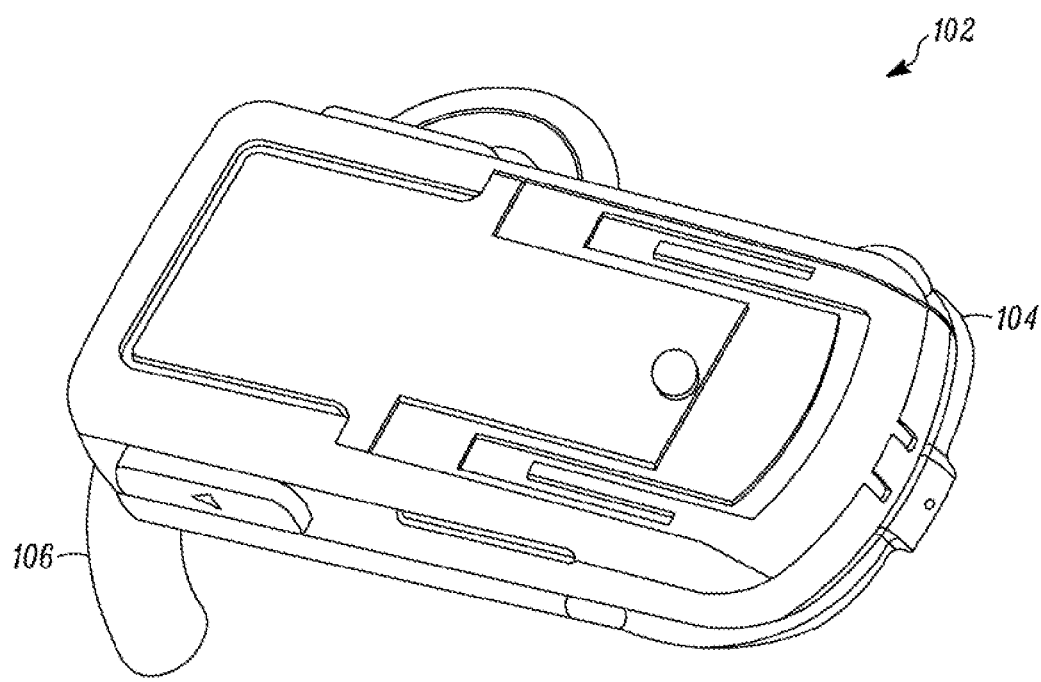
FIG. 1 depicts a view of an embodiment of an electronic device having a housing and an earmount coupled to the housing by a connector.

As volume, surface area, and weight limitations of a wearable hands-free device become more stringent, it may be beneficial to utilize the earmount of a head worn device to house electronic components. For example, it may be beneficial to house in an earmount electronic components that are used for example, intermittently. It may also be beneficial to utilize the earmount connection of a head worn device to enable connection to electronic components that are user specific, components that are accessories, and components that are peripherals. Examples of such components are a connector used for charging, a USB connector used for programming or accessories, Bluetooth and/or WiFi capability, Transflash or other type of extra memory, a SIM card, GPS capability, an accelerometer for motion detection, an RFID chip, a camera, a spare battery, a vibrator for a silent alert, a detachable display, and a speaker for speaker phone capability.

It may be beneficial to provide a manner for electrical connections, and communication and power transfer, between electronic components of an earmount and the main device. Accordingly, it may be beneficial to configure the hinge or other point of attachment of the earmount to the main device with electrical connectors for communication and power transfer between the electronic components of the earmount and the main device so that a plurality of functions of the device are available via the same connector. Accordingly, it may be beneficial for the electrical connectors to include band encoding and/or angle encoding to allow for different functions available via the same connector based upon the position of the shaft to one or the other hinge sleeves. The electrical connectors may beneficially allow for reversible plug orientation so that the user may wear the device on either ear. The earmount may also be configured to freely, resistively, or incrementally rotate about the axis of a connector shaft for the angle encoding.

Disclosed is a connector including two mating sleeves, at least one of which having a plurality of first conductive contacts, a second mating sleeve configured to be rotatably joined to the first mating sleeve and also configured to support circuitry. The connector may also include at least one shaft configured to join the two mating sleeves to form a hinge. The shaft may further include a plurality of second conductive contacts, at least some of which that form portions of rings to make intermittent contact with at least one of the first conductive contacts based on the position of the at least one shaft relative to the position of at least one of the two mating sleeves.

In different embodiments, the two mating sleeves and the at least one shaft may form a first described jack style hinge configuration, a second described hinge and pin style configuration, a third described hinge without a pin style configuration, or a fourth described spring loaded bolt configuration. It is understood that in any embodiment including those discussed below as well as others, the earmount may beneficially house electronic components that may be used intermittently, as well as electronic components that are user specific, components that are accessories, and components that are peripherals to increase functionally of a device that otherwise has limited surface area and interior volume. It is also understood that in any embodiment including those discussed below as well as others, the described connector may beneficially enable connection to electronic components, not necessarily incorporated into an earmount but incorporated into another device, that are user specific, accessories, and peripherals to increase functionally of a device that otherwise has limited surface area and interior volume.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Figure 2:
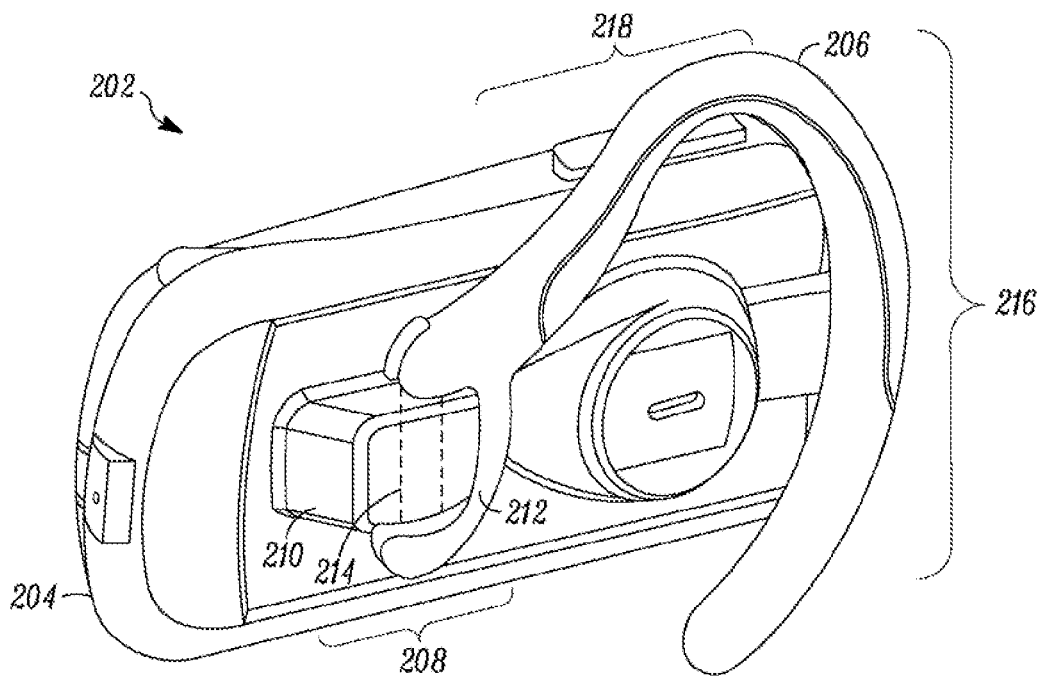
FIG. 2 depicts another view of the embodiment of FIG. 1.

FIGS. 1 and 2 depict two views of an embodiment of an electronic device that may be a wireless communication device such as a cellular telephone or a headset. Referring first to FIG. 1, the device 102 can include electronic components that are supported by a housing 104 having a limited surface area and interior volume. An earmount 106 may be disposed proximal the housing 104 and coupled with the housing. In this manner, the device 102 may be configured as a wearable electronic device. It is understood, however, that the connector or connectors described in detail below may be used in any type of device, head worn or otherwise. For example, any device that includes a hinge, such as a laptop computer, a handheld communication device such as a clamshell form factor device, or a foldable electronic game may incorporate the described connector. The described band encoding and angle encoding may be useful in a variety of applications including, but not limited to, those described below.

Turning now to FIG. 2, the earmount 206 may be coupled with the housing 204 by a connector 208. The connector 208 may include two mating sleeves, at least one of which 210 having a plurality of first conductive contacts. A second mating sleeve 212 may be configured to be rotatably joined to the first mating sleeve 210, and may include supporting circuitry. At least one shaft 214 may be configured to join the two mating sleeves to form a hinge. The second mating sleeve 212 may be a portion of the earmount 206 or may be a different type of component. In this manner, one of the two mating sleeves and the at least one shaft may form an interface.

As mentioned above, four connector embodiments are described in detail. It is understood that the connector is not limited to the described embodiments. In an embodiment, the two mating sleeves 210 and 212 and the at least one shaft 214 may form a jack style hinge configuration, in which the at least one shaft 214 may be inserted into the first sleeve 210 as would a jack or similar electrical connector. In a second described embodiment, the two mating sleeves 210 and 212 and the at least one shaft 214 may form a hinge and pin style configuration, in particular a hinge and pin style configuration in which the pin is removable. In yet a third described embodiment, the two mating sleeves 210 and 212 and the at least one shaft 214 may form a hinge without a pin style configuration, that is, a hinge in which the first sleeve 210 or the second sleeve 212 may be integral with the connector shaft 214. In still a fourth described embodiment, the two mating sleeves 210 and 212 and the at least one shaft 214 may form a spring loaded bolt configuration, in which a spring tab may provide for opening the spring loaded bolt configuration to enable separation and/or insertion of one sleeve with another.

The earmount 206 of the described wearable electronic device may have a hook shape such as that depicted in FIG. 2, for example, or may have a loop shape. In either case, the earmount 206 may have an arcuate shape adapted to conform to the shape of a user's ear. It is understood that any suitable shape of the earmount 206 is within the scope of this discussion. Moreover, the connector may connect at least any two types of electronic components and is not limited to the earmount configuration described below.

The connector 208 utilized in an earworn device may be configured as a rotatable attachment point so that once the device 202 is placed on a user's ear, the earmount 206 may swivel enough to alleviate pressure on the ear, while still maintaining a secure position.

It is understood that the wearable electronic device 102 (see FIG. 1) may be implemented as a wireless communication device such as a cellular telephone (also called a mobile phone) or a headset or other type of ear worn device. The mobile communication device 102 represents a wide variety of devices that have been developed for use within various networks. Such communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

It is further understood that any type of functionality may be incorporated as part of the device 102 (see FIG. 1). As mentioned above, the makers of mobile communication devices, including those of cellular telephones, are increasingly adding functionality to their devices. For example, cellular telephones include features such as still and video cameras, video streaming and two-way video calling, email functionality, Internet browsers, music players such as MP3 players, AM and/or FM radios with mono or stereo audio, and organizers. For video streaming, a folding display may be incorporated onto the housing 104 so that when the device 102 is worn, the display screen is folded in next to the housing 104.

Returning to discussion of FIG. 2, it depicts a second view of an embodiment of an electronic device 202 such being, for example, a jack style configuration, as discussed above. The depicted earmount 206 may include an overhanging portion 216 and a hinge portion 218 that may include the second sleeve 212. The second sleeve 212 may couple the earmount 206 to the housing 204 within a portion of the housing that may contain the first sleeve 210.

Figure 3:
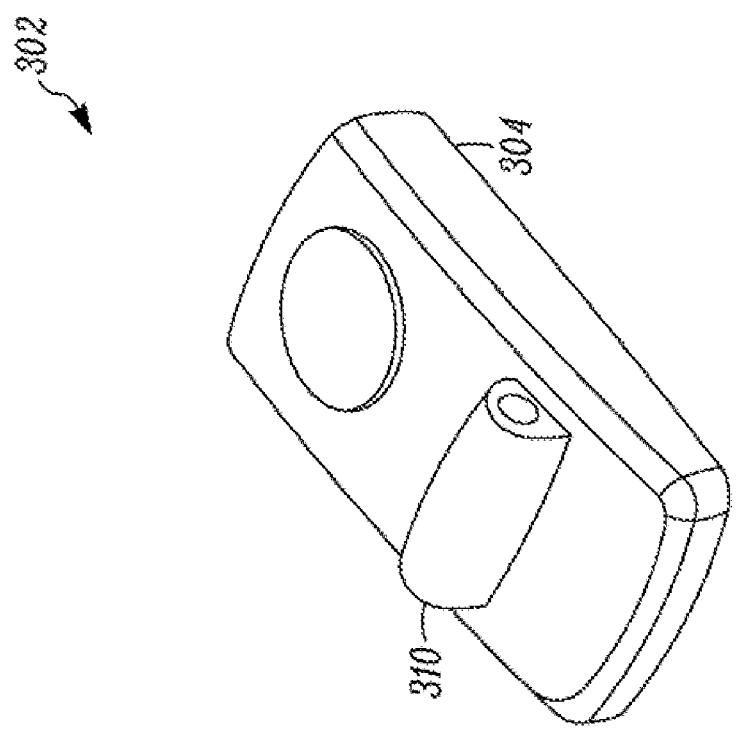
FIG. 3 depicts a first described embodiment being a jack style configuration for a wearable electronic device.
Figure 3:
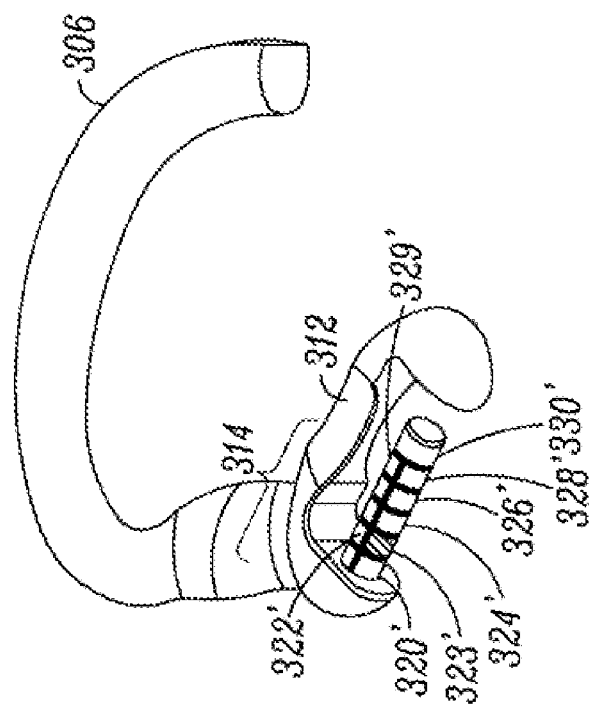

Turning now to a more detailed discussion of the connector, FIG. 3 depicts an embodiment earlier described as a first embodiment being a jack style configuration for a wearable electronic device 302. In FIG. 3 the earmount 306 is shown detached from the housing 304. As mentioned, since the earmount may be detachable, the earmount 306 may be reversed so that the wearable device 302 may be worn on either of the user's ears. The first connector sleeve 310 may be affixable to the housing 304. The second connector sleeve 312 may be affixable to the connector shaft 314. The connector shaft 314 may include second conductive contacts 320', 322', 324', 326', 328', and 330'. Moreover, one or more of the conductive contacts may form portions of rings or bands as discussed above. The first sleeve 310, the second sleeve 312, and the shaft 314 may form a jack style hinge configuration as shown, or may have any other configuration.

As discussed, the bands may provide a plurality of functionality. One or more of the conductive contacts 320', 322', 324', 326', 328', and 330' may form bands, as mentioned above. The bands may be separated from one another by insulating material. Moreover, a single band may be partitioned into band portions to form two different contacts, for example 328' and 329' as shown, the band portions being separated by insulating material. That is, part of the surface of the connector shaft may include a portion of a band of insulating material, for example, 323'. It is understood that a conductive contact may have a configuration other than ringlike or bandlike, for example, 330' which may include the tip or end of the connector shaft 314. If a contact of a sleeve comes into contact with the insulating material between band portions, then no function will be operated while there is an interruption of electrical contact. In this way, a function may be turned on or off depending upon the position of the connector shaft with respect to one or more of the sleeves.

Figure 4:
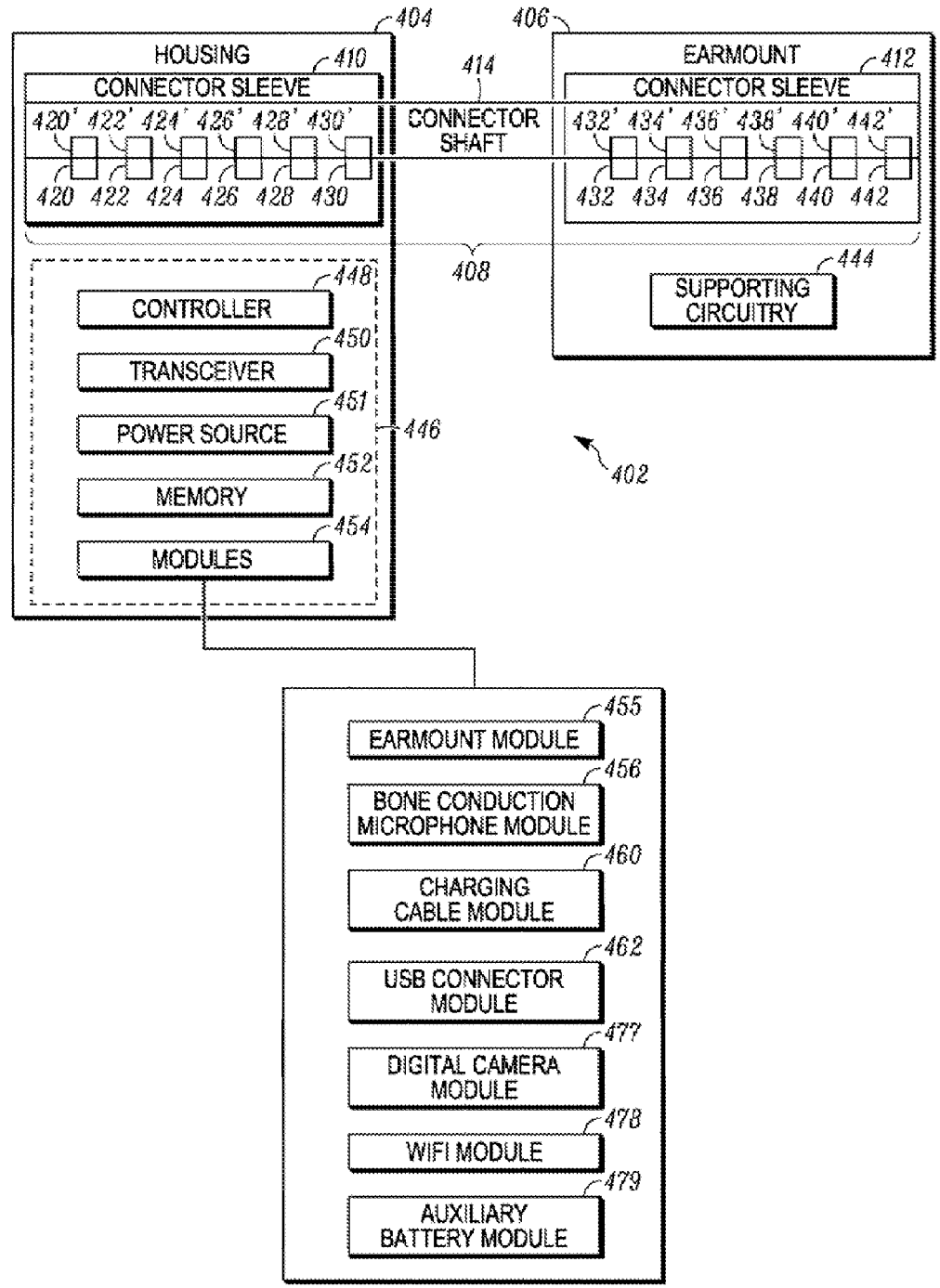
FIG. 4 depicts as a block diagram an embodiment of an electronic device having a housing and an earmount coupled to the housing by a connector.

FIG. 4 depicts as a block diagram an embodiment of an electronic device 402 having a housing 404 and an earmount 406 coupled to the housing 404 by a connector 408. As mentioned above, the connector may be used for any type of electronic device. The connector 408 includes two mating sleeves 410 and 412. At least one of the sleeves, for example a first sleeve 410, has a plurality of first conductive contacts. For example, there may be six first conductive contacts, 420, 422, 424, 426, 428, and 430. It is understood that there may be more than six or fewer than six first conductive contacts in an embodiment. Because of the below-described band encoding and/or angle encoding of the described connector 408, the six contacts may be reversed so that when worn on either side of the head, the connector contacts are in the same configuration or have the same order.

In the case of the earmount connector, it may be beneficial that it be rotatable. The second mating sleeve, for example, sleeve 412, may be configured to be rotatably joined or coupled to the first mating sleeve 410. The second sleeve 412 may include conductive contacts as well. For example, the second sleeve 412 may include six conductive contacts 432, 434, 436, 438, 440, and 442. The first sleeve 410 and the second sleeve 412 may include supporting circuitry 444 to enable specific functionality associated with the earmount, as discussed below.

In different embodiments there may be a single connector shaft or a plurality of connector shafts. More than one connector shaft, for example, may enable different modes or functionality of the electronic device 402, as discussed below. In an embodiment a user may, for example, connect an accessory, a peripheral, or another electronic component via a particular connector shaft configured to support use of the accessory, peripheral, or component with the device 402. It is understood that a particular sleeve may be similarly configured to support use of any specific accessory, peripheral, or component with the device 402.

A connector shaft 414 may be configured to join or couple the two mating sleeves 410 and 412 to form a hinge. In this manner the connector shaft 414 may provide mechanical coupling between the two sleeves 410 and 412. The connector shaft may include second conductive contacts 420'-430' to corresponding to the first conductive contacts 420-430 of the first sleeve 410, and may include conductive contacts 432'-442' corresponding to the conductive contacts 432-442 of the second sleeve 412. The two sets of conductive contacts 420'-430' and 432'-442' may be connected, for example by conductors internal to the connector shaft 414. In another embodiment they may constitute the same conductors, that is, for example, 420'=432', 422'=434', and so on. In this manner the connector shaft 414 may provide electrical coupling between the two sleeves 410 and 412 in a manner that allows for different functions of the device to be operable based on the position of the shaft in either of the sleeves. In such an embodiment, the connector shaft 414 may be removable, for example, configured as a removable hinge pin.

As discussed above, different functions of the device may be operable based on the position of the shaft in either of the sleeves. At least some of the second conductive contacts 420'-430' on the connector shaft 414 may form portions of rings or bands to make intermittent contact with at least one of the first conductive contacts 420-430 based on the position of the connector shaft 414 relative to the position of at least one of the two mating sleeves 410 and 412. See FIGS. 3, 5, 7 and 8 for more detail on ring portions. While allowing for reversible orientation, the connector 408 may thus include band encoding through connections made to different rings. The connector 408 may further allow for angle encoding since a change in orientation may provide for contact with a different portion of a ring. The earmount 406 also may be configured to freely, resistively, or incrementally rotate about an axis of the connector shaft 414 to activate different functions based on an angle encoding.

The housing 404 may further include supporting circuitry 446 to support functionality of the wearable electronic device 402. Accordingly, the first sleeve 410 and the second sleeve 412 may be coupled to the housing 404 that may contain circuitry to direct signals received from electronic components of the earmount 406, or received from electronic components coupled via connector shaft 414 to the housing 404, to supporting circuitry 446 that may be supported by the housing 404. The supporting circuitry 446 may include, for example, a controller 448. The supporting circuitry 446 may in addition include a transceiver 450 coupled to the controller 448. Either or both of the controller 448 and the transceiver 450 may be coupled to one or more of the first conductive contacts 420-430. The housing 404 and/or the supporting circuitry 446 may in addition include a power source 451, which may be, for example, a rechargeable battery. The supporting circuitry 446 may further include memory 452 coupled to the controller 448. It is understood that the memory may in addition be coupled to one or more of the first conductive contacts 420-430. The supporting circuitry may be configured to activate a first mode of the device and a second mode of the device 402.

Modules 454 may also be included in the supporting circuitry 446. In an embodiment, modules 454 may include instructions in memory 452. In another embodiment, modules 454 may include hardware coupled to the controller, transceiver, or other supporting circuitry, and alternatively or in addition modules 454 may be coupled to one or more of the first conductive contacts 420-430.

The modules 454 may include for example, an earmount module 455, a bone conduction microphone module 456, a charging cable module 460, a USB connector module 462, a digital camera module 477, a WIFI module 478, and an auxiliary battery module 479, which will be discussed in more detail below. The modules can carry out certain processes of the methods as described herein. Steps of methods may involve modules and modules may be inferred by the methods discussed herein. The modules can be implemented in software, such as in the form of one or more sets of prestored instructions, and/or in hardware, which can facilitate the operation of the mobile station or electronic device as discussed below. The modules may be installed at the factory or can be installed after distribution by, for example, a downloading operation. The operations in accordance with the modules will be discussed in more detail below.

FIG. 5 depicts a connector shaft including two conductive portions of a ring having insulating material between the conductive portions illustrating in more detail one of the plurality of rings shown in FIG. 3. The first sleeve 510 may receive a second sleeve including a shaft 514 having contacts, for example 520a' and 520b'. The connector shaft 514 may be inserted from the side, as shown, into the first sleeve 510. Upon insertion to a first sleeve 510, the contacts 520a and 520b of the first sleeve 510, for example, may compress the connector shaft 514 against the upper inside surface of the first sleeve to help prevent accidental removal. It is further understood that a conductive contact of the connector shaft may contact one or the other of the contacts 520a and 520b depending upon the position of the shaft relative to the sleeve. For example, conductive contact 520a' of the connector shaft 514 may contact the conductive contact 520a of the first sleeve 510.

As mentioned above, the connector shaft 514 may include portions of rings made of insulating material, to further separate a ring or band into two or more separate conductive contacts. A portion 521a of insulating material and a portion 521b of insulating material may separate two conductive contacts 520a' and 520b' for example as shown. In a configuration of the connector shaft 514 where the conductive contact 520a makes contact with the conductive contact 520a', the conductive contact 520b makes no contact with a conductive contact, but instead makes contact with the insulating material of portion 521b. Orientations and positions of insulating regions of the corresponding contacts may be analogous to those shown in FIG. 5, or may be oriented or positioned differently. Moreover, insulating portions may provide partitioning of a band into three or more conductive contacts for particular functionality. In this manner, moving the orientation of the earmount 306 (see FIG. 3) relative to the housing 1004 may engage the conductive contacts 320'-330' of the connector shaft 314 with particular conductive contacts of the first sleeve 310, and may also secure the two sleeves against separation. In this manner, various types of connections can be made to the device 302.

As mentioned various electronic components that may be used intermittently, as well as those that are user specific, accessories, and peripherals may be housed in an earmount. The position of the shaft relative to the sleeve may orient the contacts so as to operate certain functions and not others. As mentioned, a connector shaft 514 as shown may be used to couple various electronic components with the device 102 (see FIG. 1). As mentioned above, examples of such components are a connector used for charging, a USB connector used for programming, Bluetooth and/or WiFi capability, Transflash or other type of extra memory, a SIM card, GPS capability, an accelerometer for motion detection, an RFID chip, a camera, a spare battery, a vibrator for a silent alert, a detachable display, and a speaker for speaker phone capability.

FIG. 6 depicts an embodiment of a wearable electronic device 602 in which an earmount is detached from the housing to illustrate that the contacts may be in a reverse order depending upon the orientation of the earmount 206 (see FIG. 2) with respect to the housing 204. Since the band encoding and/or angle encoding allows contacts to be activated depending upon the shaft's orientation to one or another of the sleeves, the earmount may be transposed to be worn on either ear without changing the contact configuration.

Returning for a moment to FIG. 2, the connector 208 may rotatably and/or detachably couple the earmount 206 to the housing 204 within a portion of the housing 204 that may contain the first sleeve 210. Upon rotation and/or detachment, the connector 208 may be configured to enable a change of the orientation or position of the earmount 206 from a first orientation or position with respect the housing 204, such as the orientation depicted, to a second orientation or position with respect to the housing 204, which may be a mirror reflection of the depicted orientation or position. Accordingly, the device 202 may be worn on either side of a user's head.

Continuing now with the discussion of FIG. 6, in the above described second embodiment, being a hinge and pin style configuration with a removable pin, the connector may include two sleeves and a removable pin or connector shaft, that is, the connector may be configured as a hinge with a removable pin. The pin or connector shaft may be keyed to a sleeve, for example the second sleeve, so that the pin may not rotate relative to the second sleeve. The connector shaft however may rotate relative to the first sleeve. In this manner, the orientation of contacts on the connector shaft may change relative to contacts of the first sleeve.

The earmount is shown detached from the housing 604 to show encoded contacts 620, 622, 624, 626, and 628. The contacts 620-528 may be encoded according to an orientation of an attached earmount 206 (see FIG. 2). In a first orientation, the contact 620 may form with the earmount a connection for a first signal Sig1, the contact 622 may form a connection for a second signal Sig2, the contact 624 may form a connection for a third signal Sig3, the contact 626 may form a connection for ground, and the contact 628 may form a connection for power. In this way, particular functionality of the earmount 206 and/or the wearable electronic device 602 may be enabled, for example when the wearable electronic device is worn on the right ear of a user.

As discussed above, the connector 208 (see FIG. 2) may be configured so as to be detachable and reattachable. Accordingly, an earmount 206 (see FIG. 2) may be attached to the wearable electronic device in a second orientation, for example, corresponding to wearing the device 202 on the left ear of a user. In the second orientation, the contact 628 may form with the earmount a connection for a first signal Sig1, the contact 626 may form a connection for a second signal Sig2, the contact 624 may form a connection for a third signal Sig3, the contact 622 may form a connection for ground, and the contact 620 may form a connection for power. In this way, particular functionality of the earmount 206 and/or the wearable electronic device 602 may be enabled, for example when the wearable electronic device is worn on the left ear. That is, the earmount may include specific functionality, and the connector may enable the specific functionality due to engagement of predetermined contacts configured to enable the specific functionality. In this manner, when the second mating sleeve is joined to the first mating sleeve by the connector shaft to form the hinge, the predetermined contacts may enable the specific functionality.

As just discussed, at least some of the plurality of first conductive contacts positioned on the first mating sleeve may be in a first order in a first position, and at least some of the plurality of first conductive contacts positioned on the first mating sleeve may be in a second order in a second position. The first order may be the mirror opposite of the second order. Alternatively or in addition, the first order may be the reverse of the second order.

As described in detail above, an earmount 206 (see FIG. 2) may be positioned in a reverse order or a mirror order, depending for example on whether the earmount 206 is attached to the housing 204 for wear on the right ear of a user, or attached to the housing 204 for wear on the left ear of a user. FIGS. 7 and 8 depict a single band with a non-conductive partition 721 and 821 respectively that may be adjacent to an unused contact in one or the other position. FIG. 7 depicts a schematic view of a connector shaft 714 in position against a contact corresponding to a right ear configuration for an earmount 406 (see FIG. 4). The connector shaft 714 may be situated within the first sleeve 710. The first sleeve 710 may include first conductive contacts, for example, 720a and 720b. A second conductive contact 720' for example, may be disposed about the connector shaft 714. It is understood that the second conductive contact 720' may be a portion of a ring. It is further understood that the first sleeve 710 may include additional first conductive contacts, and that the connector shaft 714 may include additional second conductive contacts. Moreover, a second sleeve 412 may include conductive contacts as well. As mentioned above, the connector shaft 714 may be in position against the contact 720b corresponding to a right ear configuration for an earmount 406. The contact 720a meets the insulating material of portion 721, so in the right ear configuration no electrical contact is made by the connector shaft 714 to conductive contact 720a. That is, the connector shaft 714 may have an orientation configured to provide electrical connection between circuitry in the main housing 404 and the earmount 406, when the earmount is configured for use of the electronic device 402 when worn on the right ear of a user.

FIG. 8 depicts a schematic view of a connector shaft 814 in position against a contact corresponding to a left ear configuration for an earmount 406 (see FIG. 4). The connector shaft 814 may be situated within the first sleeve 810. The first sleeve 810 may include first conductive contacts, for example, 820a and 820b. A second conductive contact 820' for example, may be disposed about the connector shaft 814. The connector shaft 814 may be in position against the contact 820a corresponding to a left ear configuration for an earmount 406. The contact 820b meets the insulating material of portion 821, so in the left ear configuration no electrical contact is made by the connector shaft 814 to conductive contact 820b. That is, the connector shaft 814 may have an orientation configured to provide electrical connection between circuitry in the main housing 404 and the earmount 406, when the earmount is configured for use of the electronic device 402 when worn on the left ear of a user.

In both FIGS. 7 and 8, the connector shaft may be configured as a removable pin for a hinge, for example, corresponding to the second above described second embodiment, that is, a hinge and pin style configuration with a removable pin, in which the connector may include two sleeves and a removable pin or connector shaft. The removable connector shaft may be keyed to prevent rotation of the shaft relative to one of the two sleeves. The keyed pin or connector shaft may rotate relative to the other sleeve. In this manner, the orientation of the conductive contacts of a sleeve and the connector shaft may change relative to one another.

Figure 9:
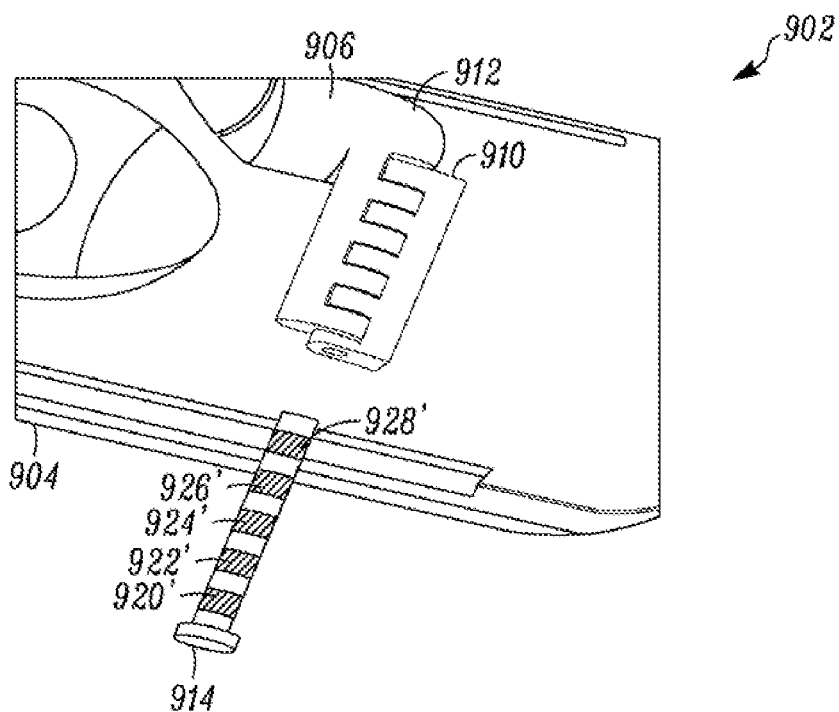
FIG. 9 depicts a second described embodiment, being a hinge and pin style configuration with a removable pin.

FIG. 9 depicts an above described second embodiment being a hinge and pin style configuration with a removable pin. In the electronic device 902 the connector 208 (see FIG. 2) may include two connector sleeves and a removable pin, as discussed above in connection with FIGS. 6, 7, and 8. Depending upon the implementation of the connector, for example, depending upon the type of device in which the described connector is utilized, any suitable hinge configuration may be used. The housing 904 or the electronic device 902 may support a first sleeve 910 of the connector 208. The electronic device 902 may be a wearable electronic device with an earmount 906 that may support a second sleeve 912 of the connector 208. A connector shaft 914 may be configured as a removable pin, enabling detachment and reattachment of the housing 904 and earmount 906. In this manner the connector 208 may be configured as a hinge with a removable pin 914. The connector shaft 914 may include conductive contacts 920', 922', 924', 926', and 928', corresponding to the contacts 620-628 of FIG. 6. Connections with mating contacts in the first sleeve 910 and the second sleeve 912 may be completed through insertion of the removable pin 914 to secure the earmount 906 to the housing 904.

Figure 10:
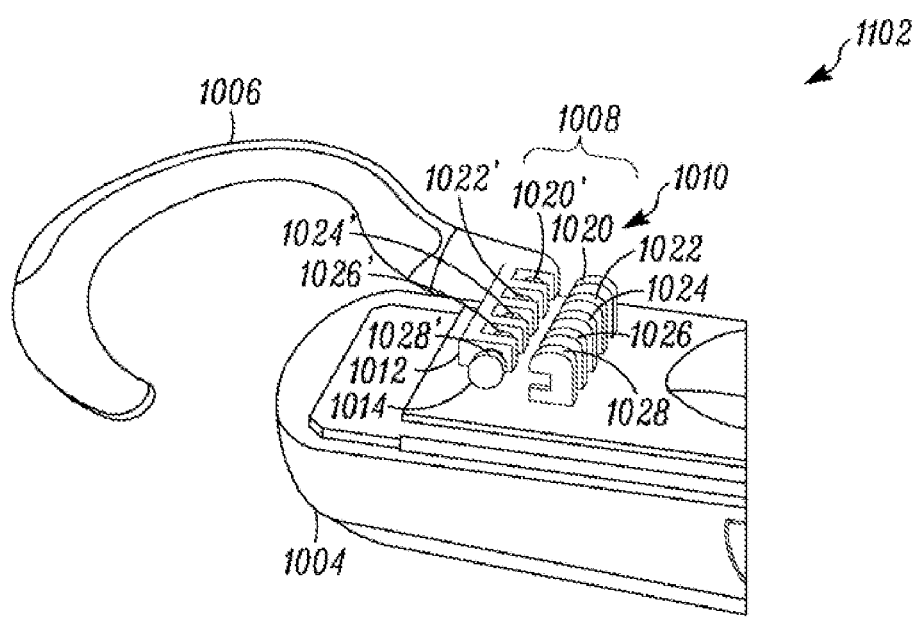
FIG. 10 depicts a third described embodiment, being a hinge without a removable pin style configuration.

FIG. 10 depicts the third described embodiment, being a hinge without a removable pin style configuration. The electronic device 1002 may include a connector 1008 without a removable pin. Even though the pin is not removable, one sleeve may be disconnected from the other sleeve, enabling the reversal of the connector connections. The connector 1008 includes a first sleeve 1010 supported by the housing 1004. The first sleeve 1010 may include a set of prongs 1020, 1022, 1024, 1026, and 1028 each of which may include a first conductive contact. The first conductive contacts of the prongs 1020-1028 may be coupled to supporting circuitry 446 (see FIG. 4) in the housing 1004.

Insertion of the connector shaft into the first sleeve to join and secure the connector shaft 1014 within the connector 1008 is described. The connector 1008 may include a second sleeve 1012 supported by the earmount 1006. The second sleeve may be integral with a connector shaft 1014. The connector shaft 1014 may include second conductive contacts 1020', 1022', 1024', 1026', and 1028' corresponding to the first conductive contacts of the set of prongs 1020-1028. The second conductive contacts 1020'-1028' may be coupled to supporting circuitry 444 (see FIG. 4) in the earmount. The second sleeve 1012 and the connector shaft 1014 may be configured along with the first sleeve 1010 to facilitate insertion of the connector shaft 1014 into the prongs 1020-1028 when the earhook 1006 has a particular orientation relative to the housing 1004, for example, as shown Once the connector shaft 1014 is inserted into the prongs 1020-1028 so as to combine the first sleeve 1010 and the second sleeve 1012 to form a completed hinge, changing the orientation of the earmount 1006 relative to the housing 1004 may both engage the conductive contacts 1020'-1028' of the connector shaft 1014 with the conductive contacts of the prongs 1020-1028, and secure the two sleeves against separation. Changing the orientation back to the above mentioned particular orientation enables separation of the two sleeves. A user can then switch the earmount to a configuration appropriate for the other ear, ready for re-insertion of the connector shaft 1014 into the prongs 1020-1028 to reattach the earmount for use. Band and angle encoding of the conductive contacts 1020'-1028' of the connector shaft 1014 may enable particular functionality of the device 1002, as previously discussed, based upon orientation or position of the earmount 1006 relative to the housing 1004.

Figure 11:
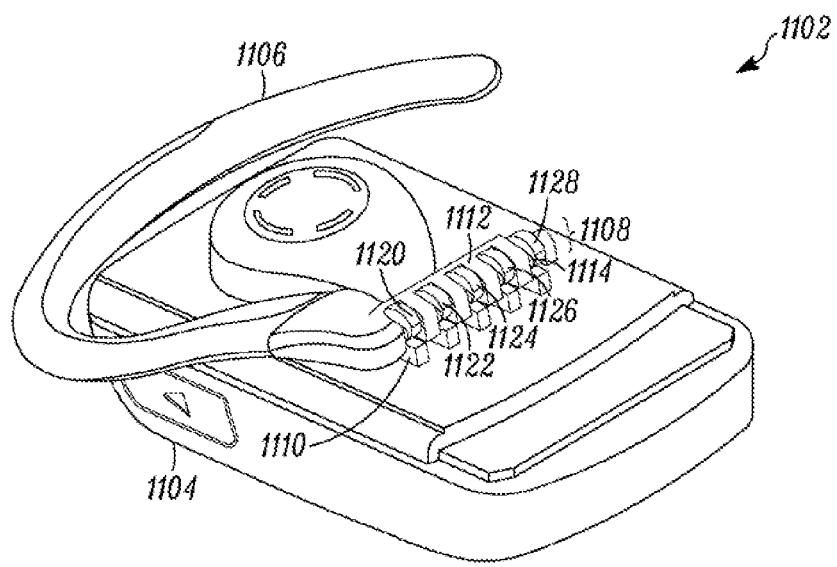
FIG. 11 depicts another view of the third embodiment, that of a connector without a removable pin.

FIG. 11 depicts another view of the third embodiment, of a connector 1108 without a removable pin. In FIG. 11, the earmount 1106 has an orientation relative to the housing 1104 of approximately 180 degrees with respect to the orientation relative to the housing 1004 (see FIG. 10) of the earmount 1006. That is, the device 1102 is configured to be ready for wearing on a right ear of a user. Because the orientation of the earmount 1106 relative to the housing has been changed from that of FIG. 10, conductive contacts within the at least one of sleeves 1110 and 1112 and connecting shaft 1114 may be engaged and the two sleeves may be secured against separation. The connector shaft 1114 is secured against removal within the prongs 1120-1128 of the first sleeve 1110. Corresponding segments of the second sleeve 1112 may alternate in the connector 1108 with the prongs 1120-1128 and may provide stability and strength to the connector.

Figure 12:
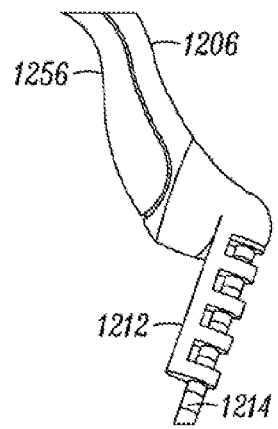
FIG. 12 depicts an embodiment for an earmount that may include a bone conduction microphone.

FIG. 12 depicts an embodiment for an earmount 1206 that may include a bone conduction microphone 1256. The bone conduction microphone 1256 may register the speech of a user either alone or in combination with a second microphone. Supporting circuitry 444 (see FIG. 4) in the earmount may include the bone conduction microphone 1256, and may in addition include additional circuitry and/or modules to support the use of the bone conduction microphone 1256. The second sleeve 1212 and/or the connector shaft 1214 may be configured to provide electrical coupling to supporting circuitry 446 in the housing 404. The supporting circuitry 446 may include, for example, a bone conduction microphone module 456 configured to provide bone conduction microphone functionality. The connector shown corresponds to a fixable pin embodiment like that shown in FIGS. 10 and 11. It is understood that an embodiment with any other style connector, for example, a jack style connector as shown in FIG. 3 may be used to connect a bone conduction microphone with the device 102 (see FIG. 1).

Figure 13:
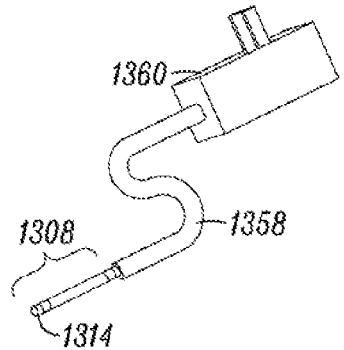
FIG. 13 depicts an embodiment for a connector that may include a charging cable and charger.

As discussed above, different types of devices may be connected to the device by the disclosed connectors. FIG. 13 depicts an embodiment for a connector 1308 that may include a charging cable 1358 and charger 1360. The charger 1360 may be configured to provide a charging current adapted for charging the rechargeable power source 451 (see FIG. 4), for example by providing a trickle charge. The charging cable 1358 may be configured to couple the charger 1360 to appropriate contacts of the connector shaft 1314. For example, contacts of the connector shaft 1314 that are coupled to power and ground of the charger 1360 may be configured to mate with contacts 628 and 626 (see FIG. 6) respectively, and/or contacts 620 and 622. The supporting circuitry 446 may include a charging module or charging cable module 460 configured to provide charging capability. The connector shown corresponds to a removable pin embodiment like that shown in FIG. 9. It is understood that an embodiment with another style connector, for example, a jack style connector as shown in FIG. 3 may be used to connect a charging cable 1358 and charger 1360 with the device 102 (see FIG. 1).

Figure 14:
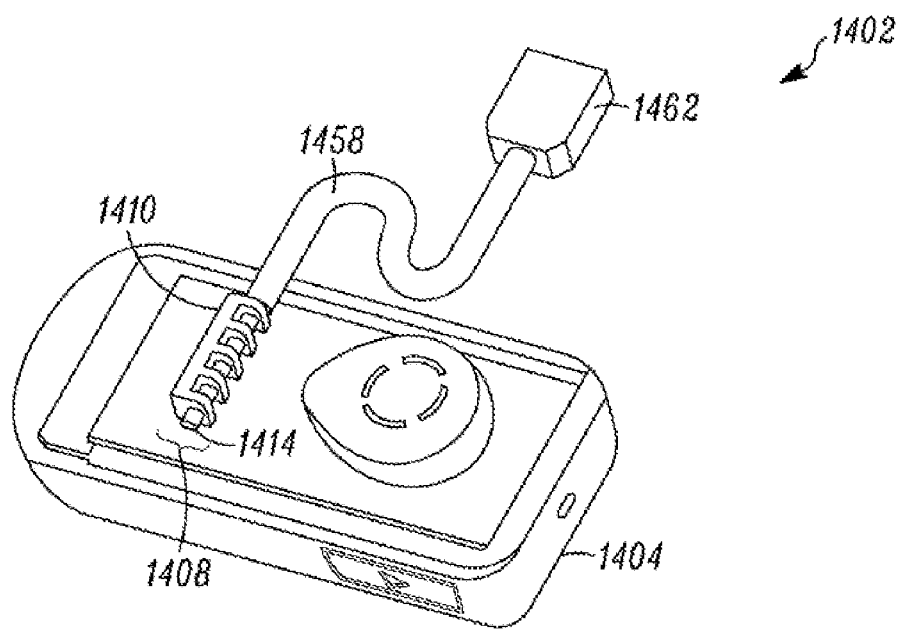
FIG. 14 depicts an embodiment for a connector that may include a cable with a USB connection.

Still more devices are described that may utilize the described connector. FIG. 14 depicts an embodiment for a connector 1408 that may include a cable 1458 with a USB connection 1462. The cable 1458 may be configured to couple the USB connection 1462 to appropriate contacts of the connector shaft 1414. For example, contacts may be configured to connect with a contact for a first signal 620 (see FIG. 6), a contact for a second signal 622, a contact for a third signal 624, a contact for power 626, and a contact for ground 628 of the first sleeve 1410 supported by the housing 1404 of the device 1402. In case the connector shaft 1414 is inserted from the opposite side, sensing circuitry in the supporting circuitry 446 (see FIG. 4) may determine orientation with which the connector shaft is positioned within the first sleeve 1410. The supporting circuitry 446 may include a USB connector module 462. The connector shown corresponds to a removable pin embodiment like that shown in FIG. 9. It is understood that an embodiment with another style connector, for example, a jack style connector as shown in FIG. 3 may be used to connect a cable 1458 with a USB connector 1462 with the device 102 (see FIG. 1).

Additional embodiments for a connector 406 (see FIG. 4) may enable a digital camera peripheral, WiFi connection capability, and an auxiliary battery. Corresponding modules 477, 478, and 479, respectively may provide detection and enable functioning. A dongle or other peripheral hardware module may support WiFi, UWB, RFID, or PAN capability that may not already be included in the wearable electronic device 102 (see FIG. 1). An auxiliary battery may provide power to augment that provided by the power source 451.

Figure 15:
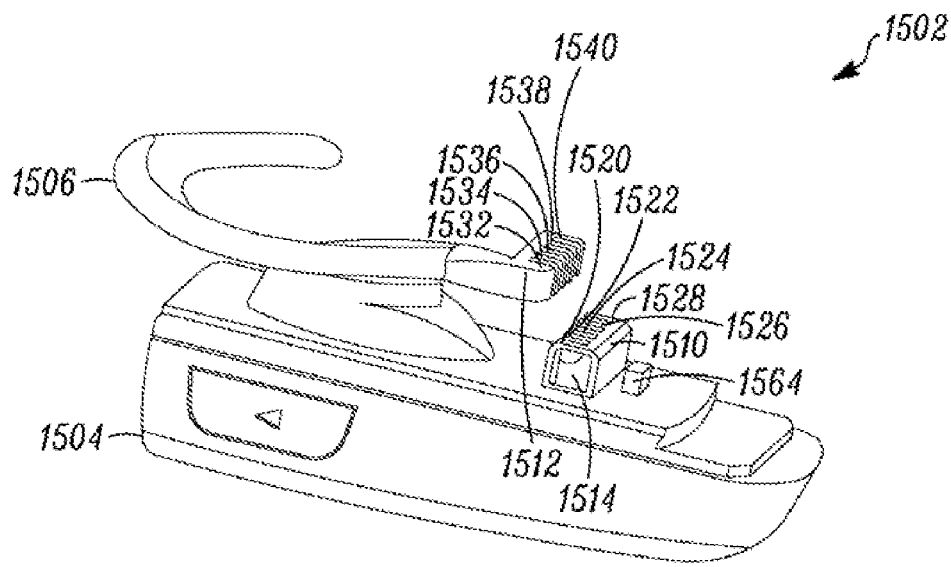
FIG. 15 depicts an embodiment of an electronic device with a spring loaded bolt/slider mechanism to enable or facilitate connection and disconnection of the connector.

FIG. 15 depicts an embodiment of an electronic device 1502 with a spring loaded bolt/slider mechanism to enable or facilitate connection and disconnection of the connector to the device 1502, that is described above as a fourth described spring loaded bolt configuration. It is understood that any engagement mechanism is within the scope of this discussion. The housing 1504 may be configured to support a slider tab 1564 that may be drawn or pushed to one side against a restoring force provided by spring loading of the slider tab 1564. The slider tab 1564 may be coupled to the connector shaft as discussed below to provide engagement and disengagement of the connector with at least one of the connector sleeve 1510 or the connector sleeve 1512.

The earmount 1506 may be fit into position when the slider tab 1564 is pushed to one side so that the slider is open. The slider tab 1564 may be coupled to the connector shaft 1514 so that the connector shaft is likewise shifted in position. The connector shaft 1514 may define segments corresponding to the prongs for example 1520-1528 of the first sleeve 1510. The segments of the connector shaft 1514 may in addition correspond to segments for example 1532-1540 of the second sleeve 1512. When the slider tab 1564 is pushed to one side and the slide is open, the segments 1532-1540 of the second sleeve 1512 may be placed between the prongs 1520-1528 of the first sleeve 1510 and the segments of the connector shaft 1514. Release of the slider tab 1564 may then result in movement of the segments of the connector shaft 1514 into apertures of the segments 1532-1540 of the second sleeve 1512, thus securing the second sleeve 1512 within the connector 408 (see FIG. 4). It is understood that the segments of the connector shaft 1514 may be configured to enable rotation of the second sleeve 1512 about the connector shaft 1514.

The slider tab 1564 may be held open during insertion of an earmount 1506 into the connector 1508. As just discussed, the connector shaft 1514 may include segments that may correspond to prongs of the first sleeve 1510. The segments of the connector shaft 1514 may furthermore correspond to segments of the second sleeve 1512 in such a manner that when the slider tab 1564 is pushed to one side and the slide is open, the segments of the second sleeve 1512 may be placed between the prongs of the first sleeve 1510 and the segments of the connector shaft 1514. The segments of the second sleeve 1512 may define apertures configured to engage the portions of the segments of the connector shaft when the slider tab 1564 is released.

Figure 16:
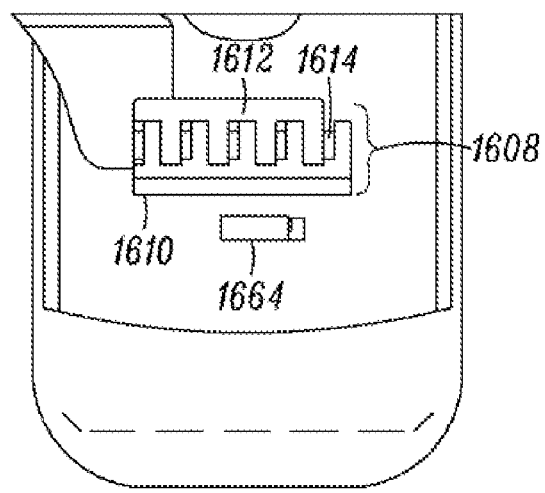
FIG. 16 depicts that when the slider tab is released, the spring loading may force the segments of the connector shaft into place to secure the first sleeve and the second sleeve together to complete the connector.

FIG. 16 depicts that when the slider tab 1664 is released, the spring loading may force the segments of the connector shaft 1614 into place within the apertures, to secure the first sleeve 1610 and the second sleeve 1612 together to complete the connector 1608.

Figure 17:
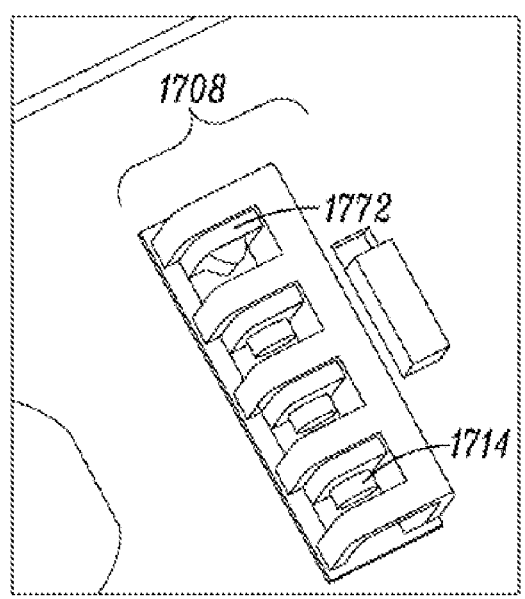
FIG. 17 depicts in close-up view a portion of the connector corresponding to FIG. 15 that shows a spring loaded bolt configuration.

FIG. 17 depicts in close-up view a portion of the connector 1708 corresponding to FIG. 15 that showed the above described spring loaded bolt configuration. As discussed above, the connector shaft 1714 may define segments that may mate with apertures in corresponding segments of the second sleeve 1512 (see FIG. 15). One or more of the segments, for example, a segment 1772 may define a V-shaped geometry instead of containing an electrical contact point. The V-shaped geometry of the segment 1772 may mate with a corresponding V-shaped slot in the earmount 1506 to provide rotational tension to assembly in a manner similar to the cam mechanisms used for example in clamshell phone open/close assist.

While the slider tab has been discussed in detail, any type of engagement and disengagement device is within the scope of this discussion. It is understood that an embodiment of a connector that includes a slider tab or any other configuration may support connection of peripherals such as a bone conduction microphone 1256 (see FIG. 12), charger 1360 (see FIG. 13), and USB cable 1462 (see FIG. 14). It is further understood that an embodiment of a connector that includes any engagement mechanism may support any peripheral such as a digital camera capability 477 (see FIG. 4), WiFi capability 478, and auxiliary battery capability 479. Connection of other peripherals and/or enablement of other capability via the connector 408 are within the scope of this discussion.

Figure 18:
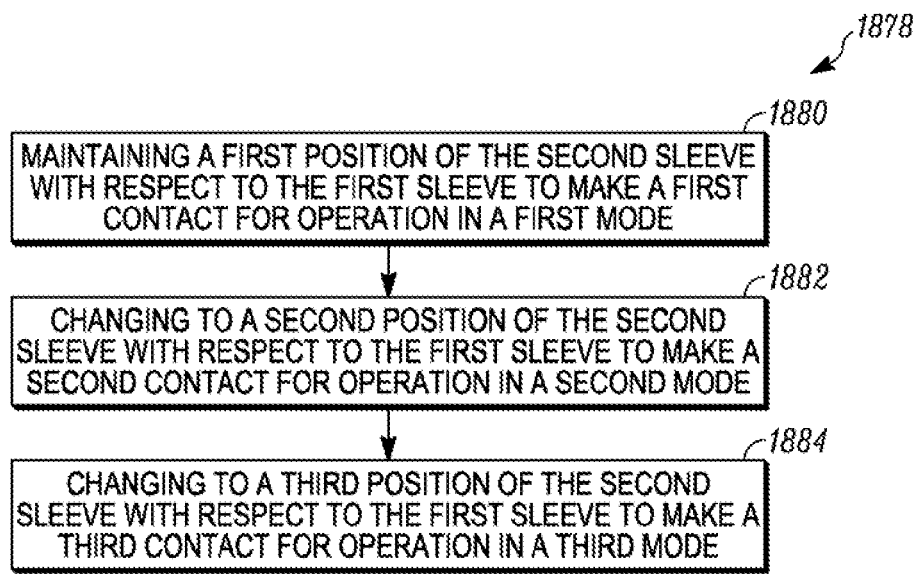
FIG. 18 depicts a flow chart of an embodiment of a method for operation of a hinge or connector.

FIG. 18 depicts a flow chart of an embodiment of a method 1878 for operation of a hinge or connector 408 that may be best described referring to the block diagram of FIG. 4. As discussed above, the hinge or connector 408 may be supported by the housing 404 of an electronic device 402. The electronic device 402 may be capable of operating in a plurality of modes. As discussed in detail, the hinge or connector 408 may include two mating sleeves, a first sleeve 410 with at least one first conductive contact positioned on the first sleeve, and a second sleeve 412 rotatably joined to the first sleeve by at least one shaft 414. The shaft 414 and/or the second sleeve 412 may include supporting circuitry that may support operation of the device 402 in one or more of the plurality of modes. The at least one shaft 414 may in addition include two or more second conductive contacts, with at least some of the second conductive contacts forming portions of rings.

The connector 408 (see FIG. 4), as described above, may be adapted for use with a wearable electronic device 402 that may include an earmount 406. The wearable electronic device 402 may be capable of multiple modes of operation. For example, the device 402 may operate differently depending on whether a user positioned or oriented the earmount 406 for use of the device 402 when worn on the right ear of the user, or when worn on the left ear. There may be in addition other orientations or positions of the earmount relative to the main housing 404 of the device 402, with associated modes of operation of the device 402.

The connector 408 (see FIG. 4) may include a first sleeve 410 and a second sleeve 412 as described above. In the described method 1878, operation of the connector 408 may include maintaining 1880 a first position of the second sleeve 412 with respect to the first sleeve 410 to make a first contact for operation in a first mode. It may be desirable to operate the device 402 (see FIG. 4) in a mode other than the first mode. Accordingly, operation of the connector 408 may include changing 1882 to a second position of the second sleeve 412 with respect to the first sleeve 410 to make a second contact for operation in a second mode. It is understood that the connector 408 may include a connector shaft 414 that can include contacts forming portions of rings. Depending on position of the second sleeve 412 with respect to the first sleeve 410, different contacts of the two sleeves or the connector shaft 414 may provide contact for specific functioning, or for a particular mode of operation, of the device 402. In another embodiment, operation of the connector 408 may include changing to a third position of the second sleeve 412 with respect to the first sleeve 410 to make a third contact for operation of the device 402 in a third mode. It is understood that the second sleeve of for example 1882 may be different from the second sleeve of 1880. For example, as discussed above, multiple modes of operation of the wearable device 402 may be supported. In one mode, an earmount 406 may provide for operation of the device 402 as a wearable electronic device. In another mode, the earmount may include a bone conduction microphone 1256 (see FIG. 12). In another mode, the connector 408 may enable a charging mode when the electronic device 402 is connected to a charger 1360 (see FIG. 13) via a charging cable 1358. In still another mode, a digital camera capability 477 (see FIG. 4) for example may be supported. It is understood that the device 402 may operate in a plurality of modes.

Figure 19:
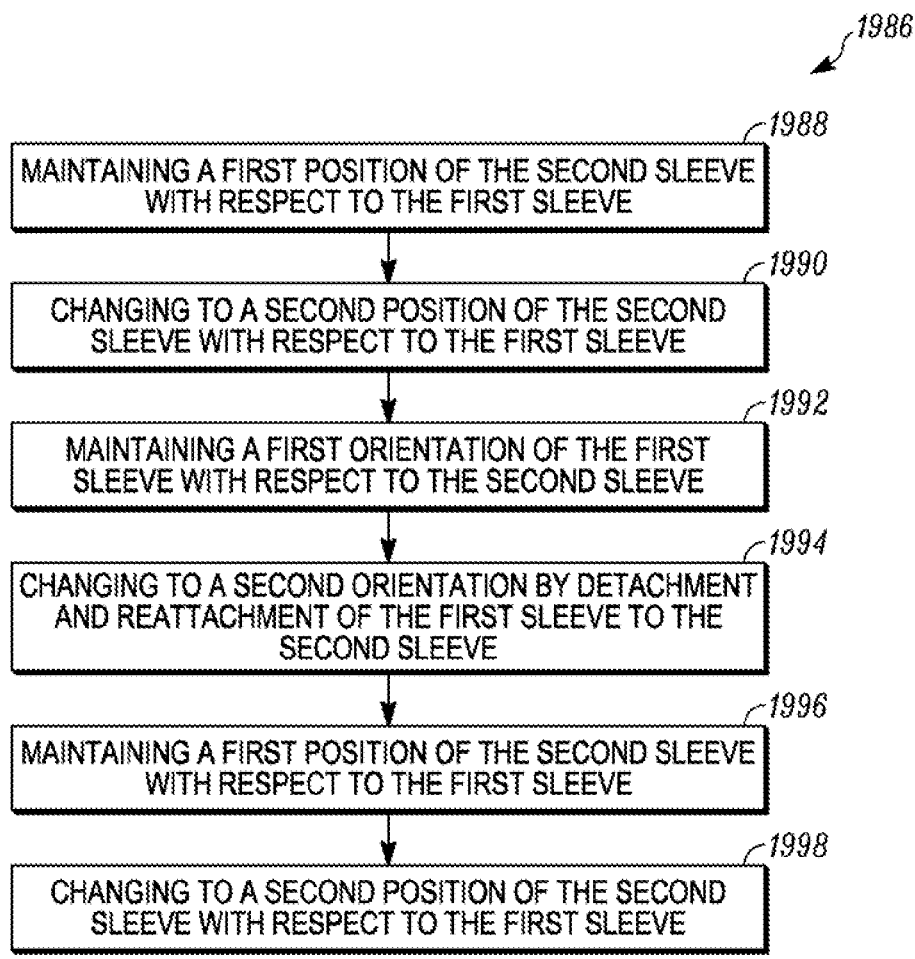
FIG. 19 depicts a flow chart of an embodiment of a method for operation of a hinge or connector.

FIG. 19 depicts a flow chart of an embodiment of a method 1986 for operation of a hinge or connector 408 that may be best described referring to the block diagram of FIG. 4. As discussed above, the hinge or connector 408 may be supported by the housing 404 of an electronic device 402. The electronic device 402 may be capable of operating in a plurality of modes. As discussed in detail, the hinge or connector 408 may include two mating sleeves, a first sleeve 410 with at least one first conductive contact positioned on the first sleeve, and a second sleeve 412 rotatably joined to the first sleeve by at least one shaft 414. The shaft 414 and/or the second sleeve 412 may include supporting circuitry that may support operation of the device 402 in one or more of the plurality of modes. The at least one shaft 414 may in addition include two or more second conductive contacts, with at least some of the second conductive contacts forming portions of rings.

In the method 1986, operation of the connector 408 (see FIG. 4) may include maintaining 1988 a first position of the second sleeve 412 with respect to the first sleeve 410 to make a first contact for operation in a first mode. It may be desirable to operate the device 402 (see FIG. 4) in a mode other than the first mode. Accordingly, operation of the connector 408 may include changing 1990 to a second position of the second sleeve 412 with respect to the first sleeve 410 to make a second contact for operation in a second mode. Operation of the connector 408 may include maintaining 1992 a first orientation of the first sleeve 412 with respect to the second sleeve 410. Operation of the connector 408 may further include changing 1994 to a second orientation by detachment and reattachment of the first sleeve 412 to the second sleeve 410 to make a second contact for operation in a second mode. In another embodiment, operation of the connector 408 may include maintaining 1996 a first position of the second sleeve 412 with respect to the first sleeve 410. In still another embodiment, operation of the connector 408 may include changing 1998 to a second position of the second sleeve 412 with respect to the first sleeve 410. It is understood that the second sleeve of for example 1990 may be different from the second sleeve of 1988.

As volume limitations of a wearable hands-free device continue to increase, it may be beneficial to utilize the earmount of a head worn device to house electronic components. For example, it may be beneficial to house electronic components in an earmount that are used intermittently, as well as those that are user specific, accessories, and peripherals. It may be beneficial to provide a manner for electrical connections and communication and power transfer between electronic components of an earmount and the main device. Accordingly, it may be beneficial to configure a connector for signal and power transfer between the electronic components of an earmount or peripheral and the main housing of the device. The electrical connectors may beneficially allow for reversible plug orientation so that the user may wear the device on either ear. While allowing for reversible plug orientation, it may be beneficial for the electrical connectors to include band encoding and/or angle encoding. The earmount may also be configured to freely rotate about the axis of the connector shaft for the angle encoding.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A connector comprising:
   two mating sleeves, at least one of which having a plurality of first conductive contacts positioned thereon, a second mating sleeve configured to be rotatably joined to the first mating sleeve and supporting circuitry therein; and
   at least one shaft configured to join the two mating sleeves to form a hinge;
   wherein the at least one shaft comprises:
      at least a plurality of second conductive contacts thereon, at least some of which forming portions of rings to make intermittent contact with at least one of the first conductive contacts based on the position of the at least one shaft relative to the position of at least one of the two mating sleeves.

2. The connector of claim 1, wherein the two mating sleeves and the at least one shaft form a jack style hinge configuration, a hinge and pin style configuration, a hinge without a pin style configuration, or a spring loaded bolt configuration.

3. The connector of claim 1, wherein the two mating sleeves are detachably connected by the at least one shaft.

4. The connector of claim 1, wherein the second mating sleeve is a portion of an earmount.

5. The connector of claim 4, wherein the earmount includes specific functionality, the connector further comprising:
   predetermined contacts configured to enable the specific functionality;
   wherein, when the second mating sleeve is joined to the first mating sleeve by the shaft to form the hinge, the predetermined contacts enable the specific functionality.

6. The connector of claim 5, wherein the second mating sleeve is a portion of an earmount that includes USB/charging interface functionality, digital camera functionality, flash memory functionality, SIM card functionality, RFID functionality, or WiFi functionality.

7. An electronic device comprising:
   a housing;
   a controller supported by the housing;
   circuitry supported by the housing in communication with the controller, the circuitry configured to activate a first mode of operation of the device and a second mode of operation of the device;
   two mating sleeves, at least one of which having a plurality of first conductive contacts positioned thereon, a first mating sleeve supported by an exterior portion of the housing, a second mating sleeve configured to be rotatably joined to the first mating sleeve and supporting circuitry therein; and
   at least one shaft to join the two mating sleeves to form a hinge;
   wherein the at least one shaft comprises:
      at least a plurality of second conductive contacts thereon, at least some of which forming portions of rings to make intermittent contact with at least one of the first conductive contacts based on the position of the at least one shaft relative to the position of at least one of the two mating sleeves to activate the first mode of operation and the second mode of operation intermittently.

8. The device of claim 7, wherein the hinge is configured as a jack style hinge configuration, a hinge and pin style configuration, a hinge without a pin style configuration, or a spring loaded bolt configuration.

9. The device of claim 7, wherein the hinge is detachably connected by the at least one shaft.

10. The device of claim 7, wherein at least some of the plurality of first conductive contacts positioned thereon the first mating sleeve are in a first order in a first position, and wherein at least some of the plurality of first conductive contacts positioned thereon the first mating sleeve are in a second order in a second position.

11. The device of claim 10, wherein the first order is the mirror opposite of the second order.

12. The device of claim 10, wherein the first order is the reverse of the second order.

13. The device of claim 7, wherein the second mating sleeve is a portion of an earmount.

14. The device of claim 13, wherein one of the two mating sleeves and the at least one shaft form an interface.

15. The device of claim 13, wherein the earmount includes specific functionality, the device further comprising:
  predetermined contacts configured to enable the specific functionality;
  wherein:
    the controller is configured to detect the specific functionality; and
    when the second mating sleeve is joined to the first mating sleeve by the shaft to form the hinge, the predetermined contacts enable the specific functionality.

16. The device of claim 15, wherein the second mating sleeve is a portion of an earmount that includes USB/charging interface functionality, digital camera functionality, flash memory functionality, SIM card functionality, RFID functionality, or WiFi functionality.

17. A method of operation of a hinge supported by a housing of a device, the device having a plurality of modes, the hinge having two mating sleeves, a first sleeve having at least one first conductive contact positioned thereon and a second sleeve rotatably joined to the first sleeve by at least one shaft and supporting circuitry therein, the at least one shaft including a plurality of second conductive contacts thereon, at least some of which that form portions of rings, the method comprising:
  maintaining a first position of the second sleeve with respect to the first sleeve so that the first conductive contact makes contact with a first one of the second conductive contacts to operate the device in a first mode of operation; and
  changing from the first position of the second sleeve with respect to the first sleeve so that the first conductive contact makes contact with a second one of the second conductive contacts to form a second position to operate the device in a second mode of operation.

18. The method of claim 17, further comprising:
  changing from the second position of the second sleeve with respect to the first sleeve so that the first conductive contact makes contact with a third one of the second conductive contacts to form a third position to operate the device in a third mode of operation.

19. The method of claim 17, wherein the first sleeve and the second sleeve are detachably joined to one another by the at least one shaft, the method further comprising:
  maintaining a first orientation of the first sleeve with respect to the second sleeve;
  changing the orientation of the first sleeve with respect to the second sleeve to form a second orientation of the first sleeve with respect to the second sleeve.

20. The method of claim 19, wherein upon changing the orientation of the first sleeve with respect to the second sleeve to form a second orientation of the first sleeve with respect to the second sleeve, the method further comprises:
  maintaining the first position of the second sleeve with respect to the first sleeve so that the first conductive contact makes contact with a first one of the second conductive contacts to operate the device in the first mode of operation; and
  changing from the first position of the second sleeve with respect to the first sleeve so that the first conductive contact makes contact with a second one of the second conductive contacts to form the second position to operate the device in the second mode of operation.

* * * * *